Dec. 8, 1942.  F. C. HUND  2,304,691
WINDSHIELD DEFROSTER
Filed March 24, 1941  2 Sheets-Sheet 1

INVENTOR.
FRANK C. HUND
BY Kwis Hudson & Kent
ATTORNEYS

Dec. 8, 1942.   F. C. HUND   2,304,691
WINDSHIELD DEFROSTER
Filed March 24, 1941   2 Sheets-Sheet 2

INVENTOR.
FRANK C. HUND
BY
Kwis Hudson & Kent
ATTORNEYS

Patented Dec. 8, 1942

2,304,691

UNITED STATES PATENT OFFICE 2,304,691

WINDSHIELD DEFROSTER

Frank C. Hund, Berea, Ohio, assignor of one-half to Simon P. Bittner, Berea, Ohio Application March 24, 1941, Serial No. 384,920

2 Claims. (Cl. 20—40.5)

This invention relates to improvements in windshield defrosters, that is to say, means for clearing windshields of automobiles and airplanes, more particularly the latter, of snow, ice and frost collecting upon them during cold weather operation.

In airplanes especially, moving through clouds at a high rate of speed, moisture collects and condenses very rapidly and forms a thick coating. It has been common practice heretofore to play a blast of warm air directly against the rear of the windshield in front of the pilot who is handling the controls, thereby clearing away a small area, perhaps six or eight inches in diameter. Such an area is too small to give good visibility for landing and the hose which conducts the warm air to the windshield interferes with vision more or less.

One of the objects of the present invention is to clear off thoroughly a relatively large area, providing good vision and thereby assisting in the prevention of accidents at landing.

Another object is the provision of novel means for effecting an equal application of heat to a large window surface in order that there may be no blind spots or spots which are but partially cleared.

Another object is the provision of means for mounting a defroster frame such that it may be quickly installed and as quickly removed or replaced.

Other objects and features of novelty will appear as I proceed with the description of that embodiment of the invention which, for the purposes of the present application, I have illustrated in the accompanying drawings, in which Fig. 1 is an elevational view of an airplane windshield equipped with my defroster.

Figure 6:
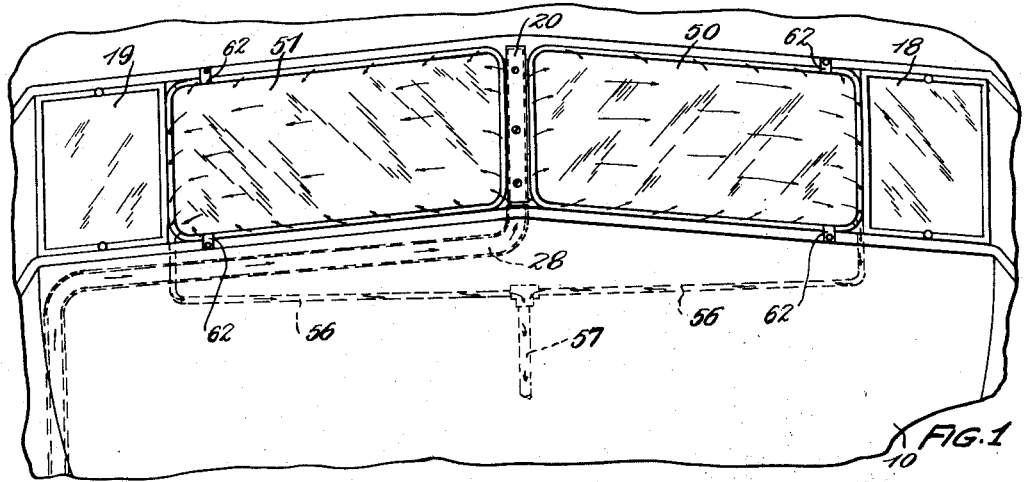
Fig. 6 is a diagrammatic illustration in plan of means commonly employed in airplanes for supplying warm air to the cabin and cockpit, and showing a take-off for supplying warm air to the defroster.
Figure 7:
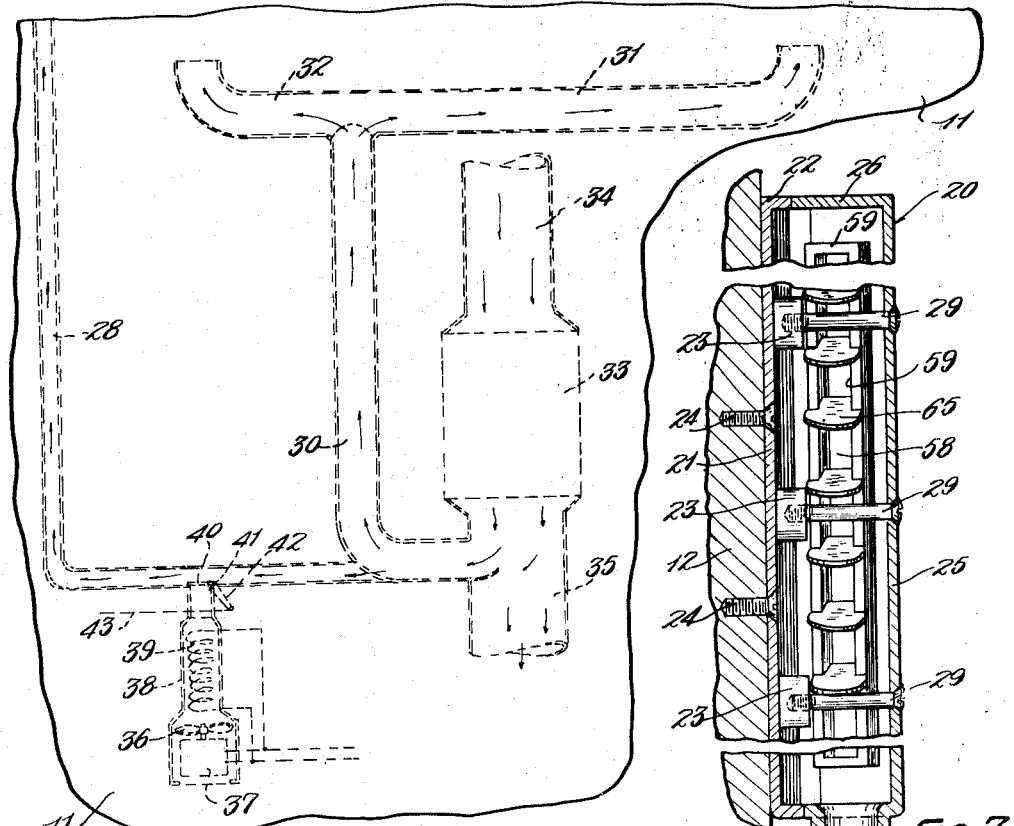
Fig. 7 is a vertical sectional view taken substantially on the line 7—7 of Fig. 5.

In the drawings I have indicated at 10 the instrument board of an airplane and at 11 the floor of the airplane. Above the instrument board there is the usual windshield comprising in the present instance a central stanchion 12 and side stanchions 13. The upper and lower rails of the windshield frame are shown at 14 and 15. These stanchions and rails are suitably grooved to take windshield glasses 16 and 17 in the usual manner. The complete windshield may incorporate further glass panes 18 and 19 which however have no connection with the present invention.

On the central stanchion of the windshield frame I mount a manifold 20 which is preferably constructed in two parts, one of which is an inner plate 21 shaped to fit the surface of the stanchion and provided with a peripheral flange 22 and a plurality of spaced forwardly extending bosses 23. This plate may be secured to the stanchion 12 by screws 24. The manifold also comprises an outer member 25 with a peripheral flange 26 adapted to meet the flange 22 and a nipple 27 for the reception of a flexible hose 28 through which warm fluid, preferably air, may be supplied to the manifold. In case warm air is used it should be supplied under pressure so that flow will be positive and relatively rapid. The outer member 25 is mounted upon and held in place with respect to the inner plate 21 by means of a plurality of screws 29 which are threaded into tapped openings in the bosses 23.

When the heating fluid is warm air it may be supplied from the heating system of the airplane. By way of example I have shown the hose 28 connected into a larger conductor 30 which, through branch conductors 31 and 32 leads to the two sides of the cockpit. 33 represents a steam radiator into which the air to be heated flows from a conductor 34 and from which the warm air flows through a conductor 35 to the cabin of the airplane. The conductor 30 is cut into the conductor 35 as indicated in the drawings.

In order to provide heated air for the defroster at times when the airplane engine is not running, I may employ an auxiliary heating apparatus comprising a fan 36 driven by an electric motor 37 which blows air through a casing 38 over an electric heating coil 39 therein. This casing is connected with conductor 28 as shown, but may be closed against back draft by a flap valve 40 which is pivoted at 41. A lever 42 fastened to the valve is arranged to be moved by the pilot through a flexible cable 43. Auxiliary heating equipment of this kind is not essential to the invention, and when present may be used at infrequent intervals only.

Figure 2:
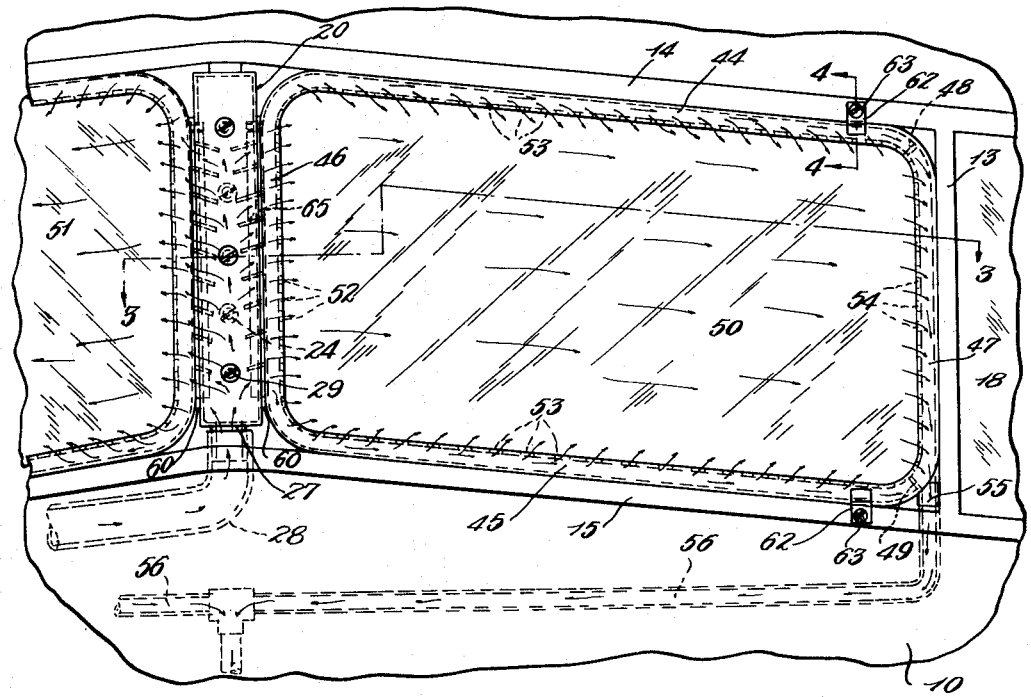
Fig. 2 is a fragmental view of the same on a larger scale.
Figure 3:
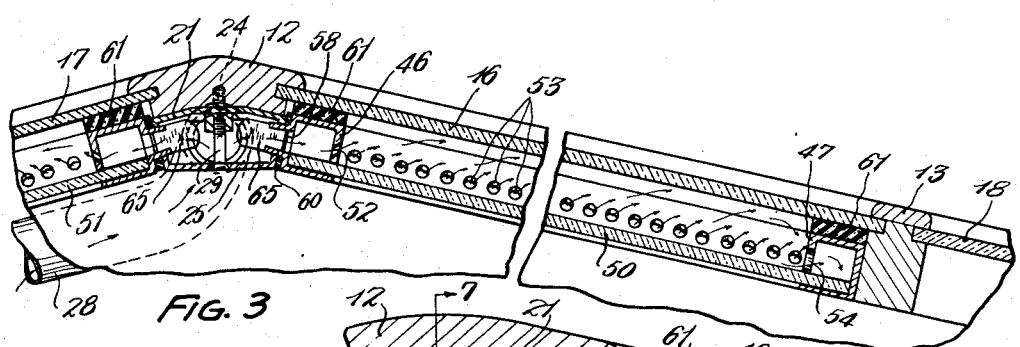
Fig. 3 is a cross sectional view taken substantially on the line 3—3 of Fig. 2.
Figures 4, 5:
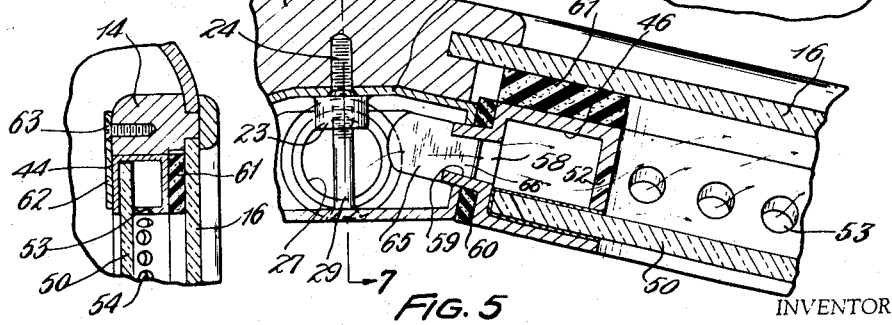
Fig. 4 is a detail sectional view taken on the line 4—4 of Fig. 2.
Fig. 5 is a fragmental section corresponding to that of Fig. 3 but on a larger scale.

As shown herein I may provide two defroster units, one on each side of the central stanchion of the windshield, although the invention in most of its aspects applies equally to a single unit. Each of these units comprises a frame made of tubing the forward face of which at least is flat in order that good contact may be had with the glass of the windshield. Preferably and as shown herein the tubing is rectangular in cross section. It is made up into a frame which may conform more or less with the shape of the windshield glass. As indicated in Fig. 2 the upper and lower sides 44 and 45 of the frame and the inner side 46 are all intercommunicating, and the outer side 47 is separated from the sides 44 and 45 by partitions 48 and 49. A defroster glass 50 is mounted in the defroster frame opposite windshield glass 16, and a second defroster glass may be mounted in the other frame opposite windshield glass 17.

Describing one defroster frame only, since they are duplicates except as to rights and lefts, the side 46 is provided with a series of openings or ports 52 in the wall which faces the interior of the frame, which ports connect the interior of the tubing with the space between the glasses 16 and 15. Preferably these ports are directed forwardly at an angle toward the glass 16. In the tubing of the sides 44 and 45 a similar set of ports 53 are formed but in this case the port area per unit of length is somewhat greater than that for the side 46. The side 47 is also provided with ports 54 and the port area for this side per unit of length is considerably greater than that of the sides 44 and 45. A nipple 55 attached to side 47 and communicating with the interior of that side receives a conductor 56, and this conductor communicates through a further conductor 57 with an air pump (not shown) or other vacuum inducing means.

The inner side member 46 of the frame in its outer wall has a mouth 58 which is surrounded by a flange 59 projecting outwardly. This flanged mouth when the unit is assembled on the windshield extends through a slot in the side wall of the manifold 20. In order to seal this joint a rubber or other gasket 60 surrounds this flanged mouth and is compressed between the manifold mouth and the member 46. Another gasket 61, preferably made of sponge rubber, extends all the way around the frame between the latter and the windshield glass 16 for sealing the space between the two glasses 16 and 50 and for providing a yieldable cushion for the frame. The mounting of the inner end of the frame is effected by the insertion of the flanged mouth 58, 59 into the slot of the manifold, and the opposite end of the frame may be supported by any suitable means, as for example by small brackets or clips 62 secured to the upper and lower windshield frame members by screws 63 or the like. Obviously therefore the removal of a defroster frame may be effected very quickly by loosening the screws 63, swinging the clips 62 out of the way and moving the frame endwise a short distance in order to withdraw the flanged mouth 58, 59 from the slot in the manifold.

Means may be employed for distributing entering fluid in the manifold. One such means is herein illustrated and consists of small baffle plates 65 spaced along the length of the flange mouth 58, 59 having tongues 66 soldered or otherwise fastened to the flanges 59. These baffles project into the manifold progressively further from the bottom to the top in order to better guide the warm air into the hollow defroster frame at the upper end of the manifold which is furthest from the entering end and thereby effect an even distribution.

When the device is in operation warm air under considerable pressure is delivered from the ports 52 and 53 into the space between the glasses 16 and 50. It flows through said space partly in response to said pressure and partly in response to the suction exerted through the discharge ports 54. By spacing the ports 52, 53 and 54 closely and regulating their size the flow of warm air into the space between the glasses will be substantially uniform from the three side members 44, 45 and 46, and with suitable pressure and suction in the lines 28 and 56 these warm gases will sweep completely through all of the space between the glasses, effectively and evenly heating the forward glass 16 and providing clear vision over the whole surface within the defroster frame.

Having thus described my invention, I claim:

1. In a defroster for windshields, a manifold secured to a windshield frame stanchion, a defroster frame formed of tubing placed adjacent the glass of the windshield, a defroster glass carried by said frame, said tubing having openings therethrough communicating with the space between the windshield glass and the defroster glass, one of said frame sides having a flanged mouth on its outer wall, said manifold having a slot to receive said flanged mouth whereby warm fluid may be introduced into the tubing of the frame through said manifold and whereby the frame side carrying said mouth is held in position, and means for securing the defroster frame to the windshield frame at a point remote from said manifold.

2. In a defroster for windshields having a frame with a central stanchion, a manifold secured to said stanchion, a pair of defroster frames each formed of tubing placed adjacent the glass of the windshield, a defroster glass carried by each of said defroster frames, said tubing having openings therethrough communicating with the space between the respective defroster glasses and the windshield glasses, one side of each of said defroster frames having a flanged mouth, said manifold having a slot on each of its side walls to receive the flanged mouth of the adjacent defroster frame, whereby warm fluid may be introduced into the tubing of each of the said defroster frames and whereby the frame sides adjacent said manifold are held in position, and means for securing the two defroster frames to the windshield frame at points remote from said manifold.

FRANK C. HUND.